United States Patent [19]

Schachar

[11] Patent Number: 4,695,163

[45] Date of Patent: Sep. 22, 1987

[54] METHOD AND APPARATUS FOR DETERMINING SURFACE SHAPES USING REFLECTED LASER LIGHT

[76] Inventor: Ronald A. Schachar, 1020 N. Highway 75, Denison, Tex. 75020

[21] Appl. No.: 745,516

[22] Filed: Jun. 17, 1985

[51] Int. Cl.$^4$ ............................ G01C 3/10; G01B 9/08
[52] U.S. Cl. ..................................... 356/369; 356/376
[58] Field of Search ............................ 356/369, 376, 1

[56] References Cited

U.S. PATENT DOCUMENTS

| | | | |
|---|---|---|---|
| 4,040,738 | 8/1977 | Wagner | 356/1 |
| 4,514,083 | 4/1985 | Fukuoka | 356/1 |

*Primary Examiner*—R. A. Rosenberger
*Attorney, Agent, or Firm*—Jerry W. Mills; Roger N. Chauza

[57] ABSTRACT

A method and apparatus for determining the surface shape of an object having an index of refraction. A laser light source (12) is incrementally movable in a rectilinear path along a track (10), and pivotal about the track (10), for scanning the surface of the object (14). A plurality of light detector segments (16) are provided on said track (10) for detecting light reflected from the object (14) which is maximally polarized when the angle of incidence equals Brewster's Angle. Means are provided for accurately determining the rectilinear and angular position of the light source (12), as well as which light detector segment (16) has received polarized light reflected from the object surface. A computer (20) is provided for receiving the positional information of the light source (12) with respect to the object surface and the light reflections received by each light detector segment (16) and therefrom calculates the spatial position of various points of reflection (24, 46, 52) from the object surface. The surface shape of the object (14) can thereby be reconstructed by plotting a two-dimensional plot of a plurality of such spatial points thus calculated.

24 Claims, 10 Drawing Figures

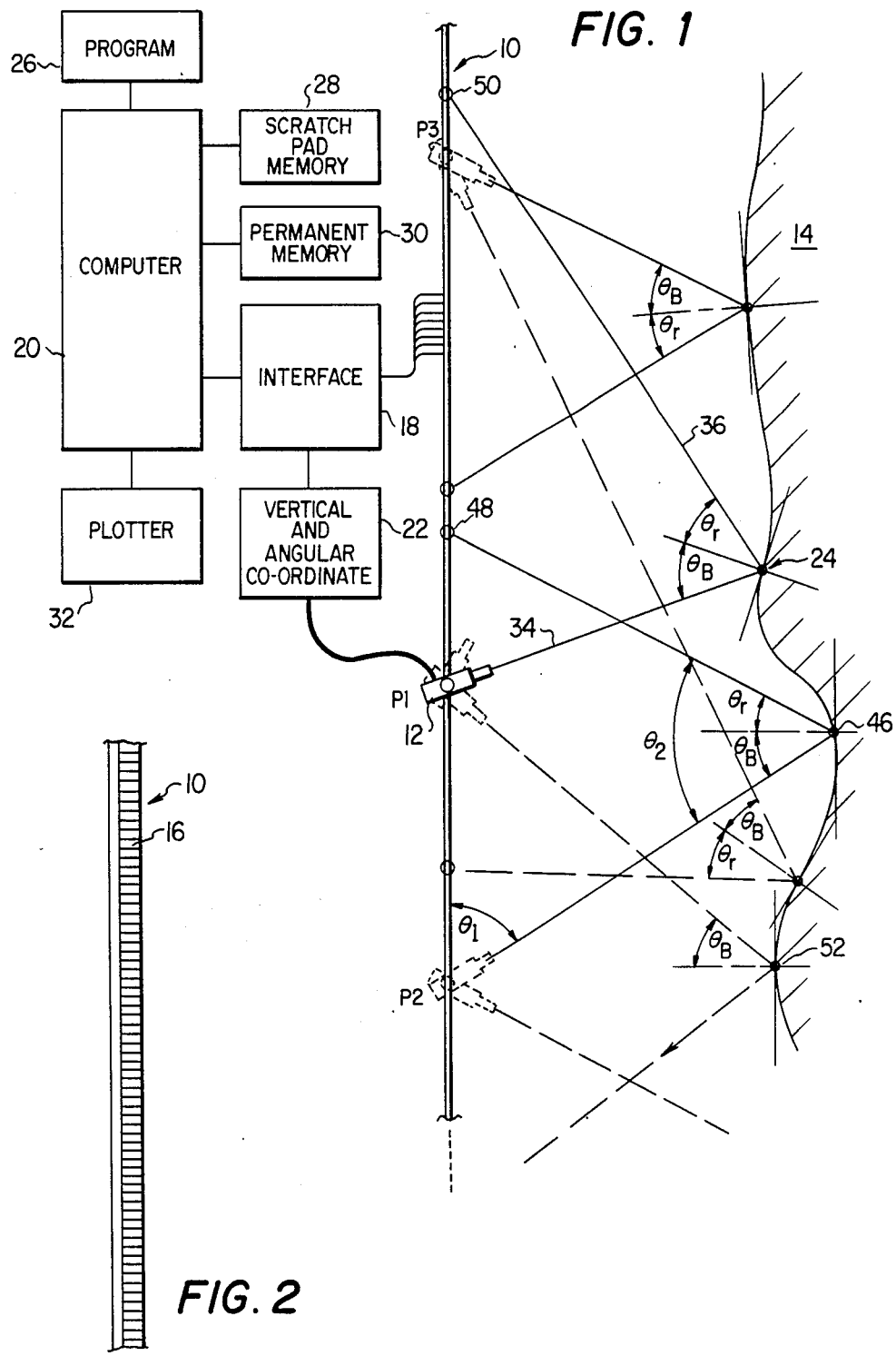

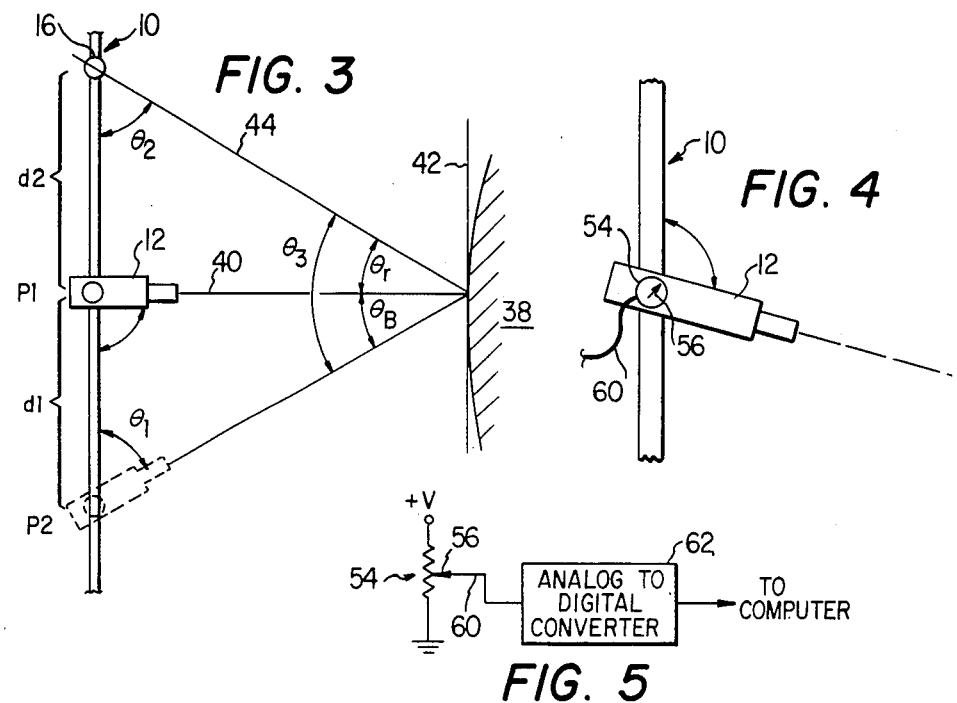
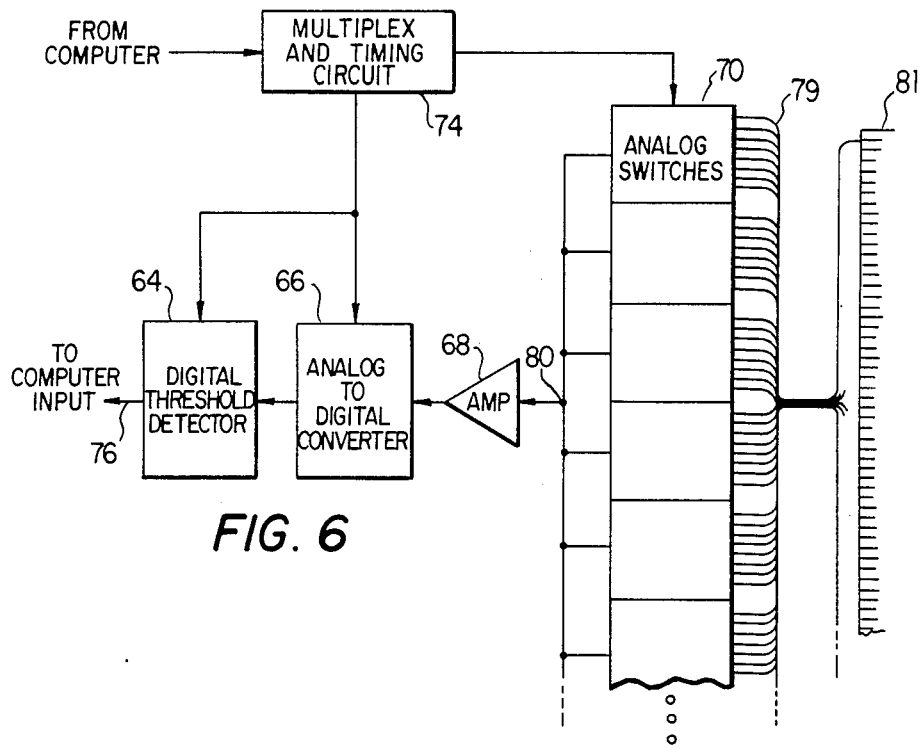

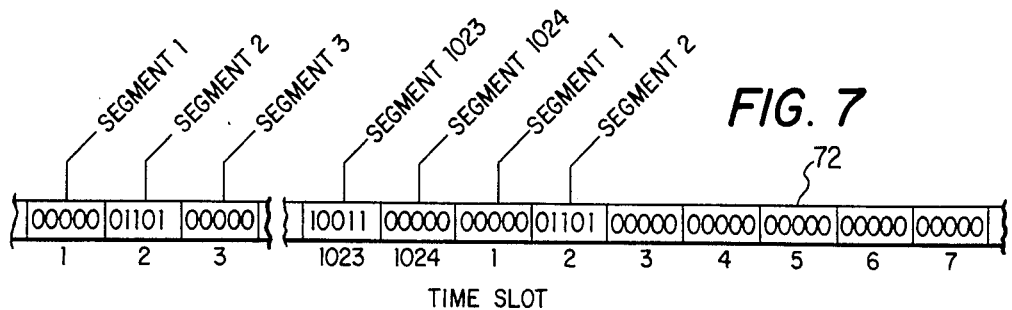
FIG. 7
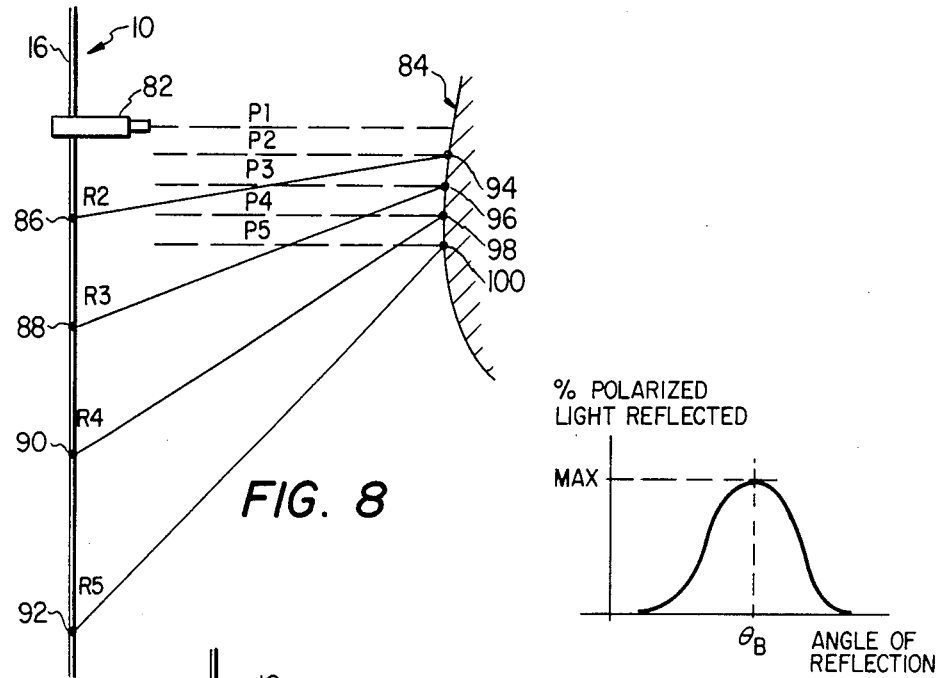
FIG. 8
FIG. 9
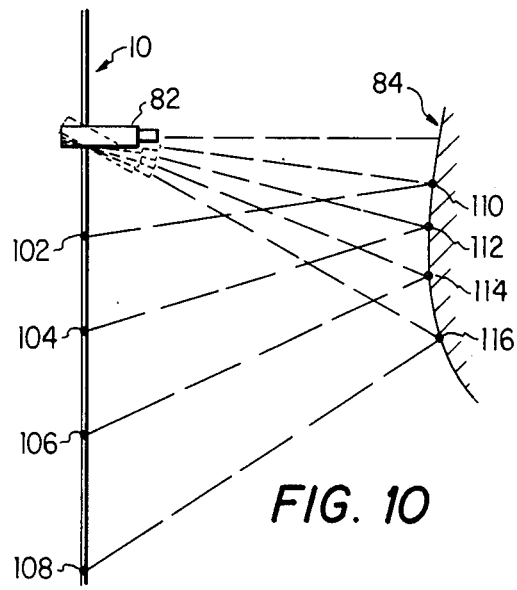
FIG. 10

METHOD AND APPARATUS FOR DETERMINING SURFACE SHAPES USING REFLECTED LASER LIGHT

TECHNICAL FIELD OF THE INVENTION

The present invention relates in general to methods and apparatus for reconstructing the shapes of objects, and more particularly relates to the reconstruction of surface shapes by directing light onto the object surface and observing the nature of the light reflected.

BACKGROUND OF THE INVENTION

Apparatus for measuring or determining the surface shape of an object finds applications in many areas. In some instances, the measuring device can be physically traversed across the surface of the object, whereby instruments record and store the shape of the path traversed.

In other situations, it is highly desirable to determine the surface shape of the object without making physical contact with the object. The measurement of the shape of the cornea of an eye is one such situation. Here, it would be extremely difficult, if not impossible, to determine the angle of curvature of the cornea by passing the measuring device physically across the surface of the cornea.

The advent of contact lenses which are worn directly on the cornea of the eye dictates that the examining doctor ascertain the exterior surface shape of the cornea very accurately. Accordingly, techniques for measuring corneal shapes are described or referred to in U.S. Pat. Nos. 3,895,860 and 3,972,602. Ophthalmometers or Keratometers are thus well known in the art for making corneal measurements.

While such instruments accomplish the desired result, they are complicated to manufacture as well as to operate, and moreover, the precision with which a measurement can be made is a function of the examiner's skill. The noted ophthalmometers and Keratometers typically rely on the use of focused light beams, together with multiple prisms and lenses, to project measurement images on the cornea.

U.S. Pat. No. 4,157,859 describes a microscope system for projecting an image on the cornea and for optically splitting the image. Disclosed in U.S. Pat. No. 4,019,813 is the use of a series of lenses and a light source, together with television and video equipment for processing the information. In yet another U.S. Pat. No. 3,895,860, there is disclosed a method of making corneal measurements using the photographic record made by a keratoscope, and from such record creating a parameter which can be used for comparing subsequent corneal measurements.

From the foregoing, it can be seen that there is a need for apparatus which is not unduly complicated to manufacture, or use, and which does not depend upon subjective judgments of the eye examiner.

Even more importantly, there is a need for a method of determining the shapes or curvatures without taking special precautions as to the surrounding ambient light, and which methods can be easily adapted for many other applications.

SUMMARY OF THE INVENTION

The present invention discloses a method and apparatus which overcomes many of the disadvantages inherent in the systems heretofore known. The present invention broadly comprises a source of coherent light, such as a laser, which is directed at the object and rotated about an arc to scan the object's surface at many positions along a rectilinear path. When the surface shape is such that a tangent thereto causes a certain reflective angle, the reflected light is maximally polarized. This particular angle, known as Brewster's Angle, is unique to the composition of the object, and is thus a function of its index of refraction. During the scanning process by the light source, a plurality of light detector segments in the rectilinear path are examined to detect which, if any, of the segments are receiving polarized light. A computerized system records the rectilinear position, as well as the angular position of the light source at each instant of time when one of the segments detects polarized light. With the information relating to the unique angle of incidence or reflection together with the recorded angular position of the light source and the distance between the light source and the segment receiving polarized light, the computer is able to define the many spatial points representative of the surface shape of the object.

In another embodiment of the invention, the light source is not rotated, but rather only moves incrementally in a rectilinear path in front of the object. Light detector segments which are also disposed in the rectilinear path detect various intensities of polarized light, the highest intensity being at Brewster's Angle. The surface shape of the object according to this embodiment can also be determined by comparing the various intensities of the polarized light detected with a graphical plot which indicates the percent of polarized light reflected as a function of angles removed from Brewster's Angle.

The features of the invention are realized by providing a rectilinear track along which the light source incrementally moves, and means for determining the angular positions of the light source as it performs a rotational scan of the object surface at each incremental position. Both the linear and angular positions of the light source are converted to digital data usable by the computer. A plurality of light detector segments are also located along the track for detecting light which is polarized parallel to the surface of the object. The position of each such light segment is permanently stored in the computer memory and thus, when a detector segment detects polarized light, the distance between such segment and the light source can be recorded. With this information, as well as the determination of Brewster's Angle from the index of refraction of the object being measured, the computer can perform a trigonometric calculation and determine the spatial point of reflection of the surface. This process is continued until a multitude of spatial points are recorded in which event the shape of the surface can be reconstructed by a computer plot, or the like.

BRIEF DESCRIPTION OF THE DRAWINGS

For a more detailed description of the construction and operation of the present invention, reference is now made to the following description taken in conjunction with the accompanying drawings, in which:

FIG. 1 is a diagrammatical view of the invention illustrating the laser light source in various positions on a light detector track with elements sensitive to reflections from the object surface, and computer processor equipment connected to the light detector segments and the light source;

FIG. 2 is an isometric view of a portion of the light detector track showing the many light detector segments;

FIG. 3 is a diagram illustrating the technique for determining the index of refraction of an object;

FIG. 4 is a side plan view of the laser light source with a potentiometer attached thereto for determining its angular position during a scan of the object surface;

FIG. 5 is an electrical diagram showing the manner in which the analog representation of the angular orientation of the light source is digitized;

FIG. 6 is a circuit block diagram showing the manner in which the analog representation of reflected light on the detector segments is digitized and multiplexed for transmission to the computer processor;

FIG. 7 illustrates the multiplexing technique according to the invention;

FIG. 8 illustrates another technique using a laser light source and light detector segments on a track, for determining the surface shape of an object;

FIG. 9 graphically depicts the intensity of polarized light reflected from an object as a function of the angle of incidence, as compared with Brewster's Angle; and FIG. 10 illustrates yet another technique of rotating a laser light source, without rectilinear movement, to determine the surface shape of an object.

DETAILED DESCRIPTION OF THE INVENTION

Referring now to the figures, there are shown the general aspects of the method and apparatus for determining and reconstructing the surface shape of an object. The apparatus is illustrated in FIG. 1 and includes a vertical track 10 on which a polarized laser light source 12 is incrementally movable along the track, and rotatable about an arc to illuminate the surface of an object 14. The invention is ideally suited for use in ascertaining the surface shapes of objects having indices of refraction, such as glass, plastic and eye corneas.

As shown in FIG. 2, the vertical track 10 includes many individual light detectors 16 along its length to detect laser light reflected from the surface of the object 14. As shown in FIG. 1, each light detector segment 16 is wired to a computer interface 18 to provide data to a computer 20 indicating the vertical coordinate of the track receiving the light. The laser light source 12 is shown at position P$_1$ along the track and, as noted, is movable vertically along the track and rotatable about its axis as shown in the phantom lines. In the preferred form of the invention it is contemplated that at each vertical position in which the light source 12 is moved it will swing about an arc and illuminate the surface of the object 14, whereupon the computer 20 will detect the segment 16, if any, which has received a light reflection.

A vertical and angular coordinate measurement device 22 is connected to the laser light source 12 to provide continuous information to the computer 20 via the interface 18, indicating exactly where the laser light source 12 is located along the track 10, and its instant angular position.

Therefore, it is envisioned that in order to determine and reconstruct the surface configuration of the object 14, the laser light source 12 will incrementally move from a position such as P$_2$ to position P$_3$ making an angular movement about each such increment. Depending on the irregularity of the object surface, light reflections at various light detector segments 16 may be detected. When detected, the vertical and angular coordinate measurement device 22 will provide the particular rectilinear location on the track 10 of the laser light source 12, as well as its angular position. The computer 20 can then associate such positional information with the particular light detector segments 16 illuminated, and determine the spatial location of a surface point, such as 24.

In reconstructing the surface shape of the object 14, the computer 20 includes a program 26 with instructions for controlling the computer 20 to store in a scratch pad memory 28 the rectilinear and angular positions of the laser light source 20, together with the fixed positions of the light detector segments 16 illuminated. Because the foregoing information is useful for only a given object, it is temporary and, therefore, may be stored in the scratch pad memory 28. The computer 20 also includes a permanent memory 30 wherein data is stored, which data does not change for each object scanned. The type of data stored in permanent memory 30 may be in the nature of a cross-reference between all of the light detector segments 16 and their fixed coordinates along the vertical track 10. To be discussed in more detail below, this information will be used to determine distances on the track 10 between the laser light source 12 located at a particular location, and its reflection on a light detector segment 16. After a complete scan of the object surface has been made, the computer 20 can plot on an X-Y plotter 32 a reconstruction of the shape of the surface. In addition, the permanent memory 30 may include data relating to standard shapes against which the reconstructed shape of object 14 may be compared to yield a number, or the like, which identifies the particular shape or radius of curvature.

In accordance with the principles of the invention, the laser light source 12 emits a coherent beam of polarized light upon the surface of the object 14, and reflections thereof are recorded by the light detector segments 16. For high resolution, it is contemplated that the diameter of the light beam 34 is no wider than the vertical height of each light detector segment 16. It is further contemplated that the polarization of the light source 12 is polarized in such a manner that the vector arrows thereof are normal to the drawing and thus parallel to the object surface.

In accordance with known physics principles, for a particular angle of incidence $\theta_i$ of light source 12, the reflected beam 36 will be maximally polarized. This is true whether or not the light source emits polarized or non-polarized light. The angle of incidence in which the light source 12 must be directed on the surface in order for maximally polarized reflection to occur is different for different objects, and depends upon the index of refraction (n) of the first medium (air, n=1) and the object (n$_2$). In the example of FIG. 1, air is the first medium and conventional glass (n$_2$=1.48) is the second medium.

Also in accordance with known principles of physics, the angle of reflection in which the reflected light is maximally polarized is known as Brewster's Angle, or $\theta_B$, and is shown by the equation below:

$$\tan \theta_B = n_2/n_1$$

For the example shown in FIG. 1, Brewster's angle may be calculated as:

$$\tan \theta = 1.48/1 = 1.48$$

$\theta_B = 56°$

For all other angles of reflection or incidence, the reflected light will not be maximally polarized.

In the embodiment of FIG. 1, therefore, since the light source 12 is polarized (with vectors normal to the drawing), the only instance in which maximally polarized light will be detected by a light detector segment 16 will be when the angle of incidence equals Brewster's Angle, or at about 56° in the example. The light detector segments 16, therefore, need not be polarized detectors but can be any light detectors, assuming then that the scanning is done in a low ambient light environment. Since the reflected light is maximally polarized at Brewster's Angle, an alternate method of detection involves the use of light detector segments with filters which are insensitive to light polarized in the plane of the object surface. With this method, the computer 20 is programmed to respond to nulls in the reflected light intensity rather than to maximum intensities.

In other forms of the invention, the light source 12 may be non-polarized, in which case the light detector segments 16 must be able to detect reflected light polarized parallel to the object surface. In this instance, at a given light source position on the track 10, and when the light source 12 is angularly scanned, unpolarized light will be reflected on various surface points on many of the light detector segments 16, but very few light detector segments 16 will receive polarized light.

With reference now to FIG. 3, and before the scanning of an object surface is conducted, one may employ the light source 12 as below described, and by calculations determine the index of refraction (n) of the object 38. To ascertain the index of refraction of an unknown object 38, laser light source 12 is moved along the track 10 until the beam 40 reflected is coincident and thus aligned with the beam 40 directed to the object 38. The position $P_1$ of light source 12 on the track 10 is then recorded. At this position, the tangent 42 to the point on the surface is parallel to the track 10 and normal to the incident light beam 40. Laser light source 12 may then be moved downwardly until maximally polarized and reflected light 44 is detected by a light detector segment 16 on the track 10. The position of $P_2$ is recorded, as well as its angle of rotation $\theta_1$. According to general principles of optics, $d_1 = d_2$, and $\theta_1 = \theta_2$. Therefore, because the angle of incidence equals angle of reflection, $\theta_3$ can be calculated. Moreover, one half of $\theta_3$ is Brewster's Angle, and by reference to trigonometric tables the number whose angle equals one-half $\theta_3$ is the index of refraction of object 38.

Having determined Brewster's Angle, such angle can be used in the FIG. 1 scan to determine the surface shape, assuming the material of object 14 is the same as that of object 38. As noted above, laser light source 12 can be incrementally moved vertically from position $P_2$ to $P_3$, such as by a linear motor or step motor (not shown) on track 10, to gather data concerning the two dimensional shape of object 14. In the case of the step motor, the number of electrical pulses applied to the motor are related to the position of the light source 12 along the track 10. At position $P_2$, a particular angular rotation of the light source 12 will result in a reflection from surface spatial point 46 and the corresponding detection of polarized light at a light detector segment identified by reference character 48. With information relating to the distance between light source position $P_2$ and the position of light detector segment 48, the angular position $\theta_1$ of the light source 12, and $\theta_B$, the spatial characteristic or coordinate of surface point 46 can be mapped and stored in scratch pad memory 28. In the alternative, rather than plotting the spatial points, all the information is available to plot on X-Y plotter 32 a plurality of tangents at each point and thus reconstruct the surface shape. Certain tangents to the surface are shown in FIG. 1. It can be visualized that if a plurality of such tangents were to be plotted, the surface shape would be reconstructed.

This same procedure is carried on as the light source 12 moves upwardly along track 10 making an angular scan at each position and recording the data thereat. It should be noted that depending upon the irregularity of the surface, more than one maximally polarized reflection may be received by light detector segments 16 on the track 10. For example, with the light source 12 at position $P_1$ in FIG. 1, a maximally polarized reflection is received at the light detector segment location denoted by reference character 50. This is the case as $\theta_i$ equals Brewster's Angle. As the light source continues to rotate downwardly at position $P_1$ another Brewster's Angle reflection is reflected from the surface at point 52 on the object 14. This reflection on a light detector segment 16, while not shown in the drawings, is detected much below the position $P_2$.

When the laser light source 12 has fully scanned the surface of the object 14, the computer 20 will have stored in memory 28 a characterization of the surface shape in digital form. This may easily be compared by the computer 20, in accordance with an algorithm in the program 26, with standard shapes of similar objects which are also stored in digital form in permanent memory 30. As noted above, the surface characterization may also be reconstructed on the plotter 32, or otherwise further analyzed by the computer 20.

As noted above, the rectilinear position of the light source linear motor along the track 10, and thus the laser light source 12, may be determined by conventional equipment. The angular position of the light source 12 may be determined by servo motor techniques, or according to the technique shown in FIGS. 4 and 5. A potentiometer 54 is mounted solidly to the light source 12 and turns as the laser light source 12 also turns in making its angular scan. The potentiometer 54 includes a wiper arm 56 which does not turn as it remains stationary with respect to the track 10. Thus, as the light source 12 is angularly scanned, the wiper arm 56 also moves across the potentiometer resistance.

A regulated supply voltage 58 is impressed across the potentiometer 54 and thus the varying voltage on the wiper arm 56 is representative of the angular position of the light source 12. The wiper arm voltage is fed via conductor 60 to an analog-to-digital converter 62 which digitizes the wiper arm voltage and presents a digital representation of the angular position of the light source 12 to the computer interface 18.

A further refinement of the invention may be employed by the use of a circuit, as illustrated in FIG. 6. A threshold detector 64 is illustrated as a hardware device interposed between the computer interface 18 and the computer 20. The computer interface 18 is further illustrated in FIG. 6 as including an analog-to-digital converter 66. It is realized that the light detector segments 16 are analog devices, i.e., the output voltage varies in accordance with the intensity of the light illuminating the segment.

According to another aspect of the invention, the analog signal from each light detector segment 16 is coupled to an amplifier 68 by way of a number of integrated circuit analog switches 70. In order to examine the light intensity information from each light detector segment 16, the hardware and electronics are economized by multiplexing the light intensity information from each light detector segment 16 into a single transmission line 76 directed to the computer 20.

FIG. 7 illustrates that the digitized information from each light detector segment 16 occupies a dedicated time slot 72 in a recurring multiplexing cycle. In other words, if there were 1024 light segments, then for each multiplexing cycle there would be 1024 time slots within which to place a digital representation of the light amplitude striking the light detector segment associated with the particular time slot.

In FIG. 7 there is shown that light detector segment number 2 is associated with dedicated time slot number 2 and has therein a digital number 01101 which. represents a certain light intensity. The same holds true for light detector segment and time slot number 1023. Thus, at the particular instant of time depicted in FIG. 7, there is a double reflection of the laser light source 12, such as at position $P_1$ on surface points 24 and 52.

With reference again to FIG. 6, a multiplex and timing unit 74 establishes the timing intervals for the circuits such that only one analog switch within the block 70 is closed during a time slot. For example, the analog voltage of the particular light detector segment 81 wired to conductor 79 is coupled to the amplifier 68 for only an instant of time, in which time no other segment voltages are coupled to the precision amplifier. The amplifier 68 may be of the sample and hold type which is provided with precision amplifying of the low level light detector segment voltages to a voltage range acceptable to the analog-to-digital converter 66. It should be noted that each analog switch block 70 services eight light detector segment wire conductors at its input, and sequentially couples each such input to the single output 78. Moreover, all the analog switch block outputs are wire "order" together at node 80 and directed to the input of precision amplifier 68.

Once the amplified analog signal has been digitized it passes through the threshold detector 64, which also is timed to make sure that the correct light detector segment data is placed into the correct time slot 72. Because the light reflected from the object surface is maximally polarized at Brewster's Angle, the threshold detector is necessary to assure that the computer does not receive those reflections near Brewster's Angle which are detected and polarized, but not maximally polarized. Moreover, the threshold detector 64 may be provided with equipment which is adjustable so that the affect of ambient light on the light detector segments 16 is negated. In other words, the threshold may automatically rise with increased ambient light.

Therefore, a threshold is experimentally arrived at which assures that those digital representations above the threshold are bona fide Brewster's Angle reflections, and those under the threshold are discarded as being non-Brewster Angle reflections. Digital comparators usable for this application are well known in the art.

While the digital threshold detector 64 has been shown as a hardware device, it should be understood that the computer 20 itself may accomplish the digital comparison according to a software routine in the program 26.

With the foregoing in mind, it can also be appreciated that the principles of the invention permit a three-dimensional characterization of a surface, either by shifting the track 10 laterally after each complete vertical scan, or by implementing a second horizontal track and light source laterally movable at the same time as the scanner system shown in FIG. 1. In the latter case one scanner system could be denominated X, and the other Y for plotting surface points in accordance with a three-dimensional coordinate system. The apparatus of FIG. 6 would be duplicated and the output of each resultant threshold detector could further be multiplexed onto one transmission line to the computer 20. In such case the data for the X scanner could be multiplexed into even numbered time slots, and the Y scanner data multiplexed into the odd numbered time slots. Of course, other multiplexing schemes may be used.

The concepts of the invention may be expanded to measure curvatures of surfaces using a slightly differernt technique. When the curvature of a surface is somewhat regular, such as the cornea of an eye, the technique shown in FIG. 8 may be employed.

Moreover, this technique may be used with the apparatus described above, however, here the light source 82 is unpolarized and does not undergo an angular rotation. Rather, the unpolarized light source 82 remains horizontally disposed, but moves downwardly incrementally along the track 10. Again, light detector segments 16 detect light polarized parallel to the surface of the cornea 84.

As the unpolarized light source 82 moves downwardly through positions P2–P5, the light detector segments 16 will receive respective light reflections $R_2$–$R_5$, the reflection from position $P_1$ being directed back to the unpolarized light source 82. During the downward movement of the unpolarized light source 82, the angle of incidence and thus also the angle of reflection of the light beam increases and eventually passes through Brewster's Angle. Again, the amount of polarized light reflected at Brewster's Angle is maximum. The percent of polarized light reflected as a function of angles from Brewster's Angle is graphically depicted in FIG. 9.

It is seen from FIG. 9 that the curve is bell-shaped with the top thereof representative of Brewster's Angle where maximum polarized light is reflected. At angles of reflection removed from Brewster's Angle, the percent of polarized light reflected is less and can be determined from the graph. Or, stated another way, knowing the percent of polarized light received, the angle of reflection can readily be determined. Assuming the index of refraction of the cornea 84 is known, then Brewster's Angle is also known. Thus, by recording the amount of polarized light received at each light detector segment 86–92 of FIG. 8, and comparing those numbers with the amount received when passing through Brewster's Angle, the respective angles of incidence can be determined. Knowing the angles of incidences, trigonometric tables can be used to determine the spatial points of reflections 94–100 and thus the surface shape.

The technique of determining the shape of a surface according to FIGS. 8 and 9 is only illustrative. In practice, the downwards movement of the light source 82 is very small, and thus the resolution of the surface shape can be quite high.

A similar technique is shown in FIG. 10 where the laser light source 82 is maintained at a fixed position on the track 10, but is moved at predetermined angles to perform the object scan. At each new angle of scan, the distance by which the reflected light moves on the track 10, such as the distances between illustrated points 102-108, can be noted and compared to determine the tangents on the object surface 110-116 causing such reflections.

Yet another technique of determining the surface configuration of an object may be visualized from FIG. 8. Rather than measuring distances as illustrated above, the laser light source 82 can be moved downwardly at a constant rate, and such rate compared with the rate at which the point on the track 10 of reflected light moves, as detected by the light detector segments 16. For a given curved surface, the rate of movement of laser light reflections can be predicted or calculated by those skilled in the art. With this technique, polarized light is not necessary, as long as some characteristic of the reflected light can be traced.

The basic concepts of the methods and apparatus for determining the surface shape of an object using the polarization of light concepts and Brewster's Angle are illustrated herein. Therefore, the description of the invention is intended to be merely exemplary and not circumcriptive of the invention as it is claimed below. The invention, thus, may be modified by those skilled in the art and yet be within the scope of such claims.

What is claimed is:

1. A method for determining the surface shape of an object when the index of refraction thereof is known, comprising the steps of:
    illuminating a plurality of points on the surface of the object with a plurality of light beams to produce a corresponding plurality of reflections, having various degrees of polarization;
    detecting the amount of polarization of the reflections of said light beams; and
    calculating spatial data of surface points of said reflections using Brewster's Angle and the amount of light polarization reflected therefrom, said data collectively being representative of the surface shape of said object.

2. The method of claim 1 wherein the detecting step comprises detecting maximally polarized reflections of light at various said surface points of reflection where the angle of a light beam incident thereto is substantially equal to Brewster's Angle.

3. The method of claim 1 wherein said illuminating step is carried out by rectilinearly and angularly moving a light beam with respect to said object to produce said plurality of reflections said detecting step comprises detecting light reflections which are maximally polarized, and with respect to each said maximally polarized light reflection said calculation includes the use of the angle of said light incident to the object surface thereat with respect to its rectilinear path of movement and the distance between a source of said incident light and a point where each said maximally polarized light reflection is detected.

4. The method of claim 1 further including the step of storing all said spatial data and after all said calculations are completed plotting all said spatial data in the nature of a plurality of points to thereby reconstruct said surface shape.

5. The method of claim 1 further including the step of storing all said spatial data and after all said calculations are completed, plotting all said spatial data in the nature of tangent lines to thereby reconstruct said surface shape.

6. The method of claim 1 further including the step of detecting reflected light at surface points, which reflected light is maximally polarized, and calculating spatial data representative of the surface shape of said object using Brewster's Angle and calculating other spatial data using nonmaximally polarized light detected at surface points having angles of reflecting different from Brewster's Angle, and calculating said other spatial data as a function of the ratio of nonmaximally polarized light reflected at said different angles to the amount of maximally polarized light reflected at Brewster's Angle.

7. The method of claim 6 further including the step of moving said light beam in a rectlinear path with respect to said object without angular movements of said light beam.

8. A method for determining the surface shape of an object, comprising the steps of:
    illuminating the surface of an object by moving a light beam at a predetermined rate with respect to said surface;
    detecting along a given path a degree of polarization of reflections of said light beam as reflected from said object; and
    detecting the rate of movement of said reflected light beams along said given path and using said degree of polarization and said movement to thereby determine the surface shape of said object.

9. The method of claim 8 wherein said illuminating step is carried out by illuminating said object with a beam of coherent light.

10. The method of claim 8 further including detecting the amount of polarization of said reflections from the surface of said object and using Brewster's Angle to determine said surface shape.

11. The method of claim 10 wherein the illuminating step comprises moving said light beam at predetermined angular movements.

12. The method of claim 8 further including detecting positions of light reflections from said object along said given path which are characterized by manixally polarized light reflections, and using Brewster's Angle to determine the surface shape of the object.

13. The method of claim 8 further including detecting the position of the reflected light in the same path traversed by the source of the light beam.

14. Apparatus for determining the surface shape of an object comprising:
    a light source;
    means for moving said light source with respect to said object;
    means for detecting polarized light reflected at various positoins from the surface of said object, an angle of said reflected light corresponding to Brewster's Angle; and
    means for calculating spatial points of polarized light reflected from said object based upon Brewster's Angle and positional characteristics of said light source with respect to said object.

15. The apparatus of claim 14 wherein said means for detecting includes means for detecting certain light reflections which are maximally polarized with respect to other light reflections from the object.

16. The apparatus of claim 14 wherein said means for moving includes means for moving said light source in a rectilinear path and for angularly moving said light source.

17. The apparatus of claim 14 wherein said means for detecting is disposed in the path of rectilinear movement of said light source.

18. The apparatus of claim 16 wherein said means for moving includes means for incrementally moving said light source along said rectilinear path, and for arcuately moving said light source so as to scan said object at each incremental position.

19. The apparatus of claim 14 wherein said moving means includes a track, and said means for detecting includes a plurality of light detector segments on said track.

20. The apparatus of claim 19 further including computer means connected to said means for moving and to each said light detector segment for calculating said spatial points.

21. The apparatus of claim 20 further including a transmission line and means for multiplexing a representation of the light intensity detected by each light detector segment onto said transmission line.

22. The apparatus of claim 21 wherein said means for multiplexing further includes means for converting analog representations of light intensities from each said light detector segment into digital signals.

23. The apparatus of claim 22 further including threshold means for comparing the intensity of light received at each said light detector segment with a reference to thereby determine maximally polarized reflections of light.

24. Apparatus for determining the surface shape of an object, comprising:
- a laser light source;
- an elongate track having disposed thereon a plurality of light detector segments;
- means for moving said light source along said track and for angularly rotating said light source about said track so as to scan the surface of said object;
- means for determining the position of said light source along said track, and for determining the angular position of said light source with respect to said track; and
- computer means connected to said means for determining, and connected to each said light detector segment for receiving positional information of said light source and light intensity information from said light detector segments, and for calculating spatial characteristics of the surface of said object based upon such positional information and light intensity information and Brewster's Angle.

* * * * *